(12) United States Patent
Bourbonnais et al.

(10) Patent No.: US 10,482,104 B2
(45) Date of Patent: *Nov. 19, 2019

(54) ZERO-DATA LOSS RECOVERY FOR ACTIVE-ACTIVE SITES CONFIGURATIONS

(71) Applicant: INTERNATIONAL BUSINESS MACHINES CORPORATION, Armonk, NY (US)

(72) Inventors: Serge Bourbonnais, Palo Alto, CA (US); Jing Cheng, Beijing (CN); You-Chin Fuh, San Jose, CA (US); David B. Petersen, Great Falls, VA (US); James Z. Teng, San Jose, CA (US); Hong Jing Ying, Beijing (CN); Miao Zheng, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 970 days.

This patent is subject to a terminal disclaimer.

(21) Appl. No.: 14/849,680

(22) Filed: Sep. 10, 2015

(65) Prior Publication Data
US 2016/0246865 A1 Aug. 25, 2016

Related U.S. Application Data

(63) Continuation of application No. 14/630,747, filed on Feb. 25, 2015.

(51) Int. Cl.
G06F 9/50 (2006.01)
G06F 11/14 (2006.01)
(Continued)

(52) U.S. Cl.
CPC ........ G06F 16/273 (2019.01); G06F 11/1402 (2013.01); G06F 11/2023 (2013.01);
(Continued)

(58) Field of Classification Search
CPC .................................................. G06F 17/30578
See application file for complete search history.

(56) References Cited

U.S. PATENT DOCUMENTS 8,121,978 B2 2/2012 Wiss et al.
8,301,593 B2 10/2012 Hoffmann et al.
(Continued)

OTHER PUBLICATIONS

List of IBM Patents or Patent Applications Treated as Related—Date Filed: Sep. 10, 2015; 2 pages.
(Continued)

Primary Examiner — Dawaune A Conyers
(74) Attorney, Agent, or Firm — Cantor Colburn LLP; William Kinnaman

(57) ABSTRACT

A system for providing continuous availability comprises a second computing site that is geographically remote from a first computing site. The second computing site comprises a storage unit configured to store units of work data and data synchronously replicated from the first computing site. The second computing site further comprises a group of workloads configured to process the units of work data asynchronously replicated from the first computing site. The second computing site further comprises a software replication module configured not to replicate any data while the first computing site is available.

4 Claims, 10 Drawing Sheets

(51) Int. Cl.
*G06F 11/20* (2006.01)
*G06F 16/27* (2019.01)

(52) U.S. Cl.
CPC ...... *G06F 11/2025* (2013.01); *G06F 11/2035* (2013.01); *G06F 11/2046* (2013.01); *G06F 11/2097* (2013.01); *G06F 16/275* (2019.01); *G06F 9/50* (2013.01)

(56) References Cited

U.S. PATENT DOCUMENTS

| | | |
|---|---|---|
| 8,650,155 B2 | 2/2014 | Corbin et al. |
| 9,449,065 B1 | 9/2016 | O'Neill |
| 2005/0251633 A1 | 11/2005 | Micka et al. |
| 2005/0289198 A1 | 12/2005 | Todd |
| 2011/0099146 A1* | 4/2011 | McAlister ........... G06F 11/3006 707/634 |
| 2012/0278283 A1 | 11/2012 | Hildebrand et al. |
| 2013/0007503 A1* | 1/2013 | Anaya ................. G06F 11/2035 714/4.1 |
| 2013/0318221 A1* | 11/2013 | Anaya .................... G06F 9/505 709/223 |
| 2014/0040206 A1 | 2/2014 | Ramakrishnan et al. |
| 2015/0212910 A1 | 7/2015 | Gondi et al. |

OTHER PUBLICATIONS

U.S. Appl. No. 14/630,747, filed Feb. 25, 2015; Entitled: "Zero-Data Loss Recovery for Active-Active Sites Configurations".

* cited by examiner

ZERO-DATA LOSS RECOVERY FOR ACTIVE-ACTIVE SITES CONFIGURATIONS

DOMESTIC PRIORITY

This application is a continuation application of the legally related U.S. Ser. No. 14/630,747, filed Feb. 25, 2015, the contents of which are incorporated by reference herein in their entirety.

BACKGROUND

The present invention relates to continuous availability between sites that are geographically separated from each other, and more specifically, to a multi-site continuous availability computing environment with a recover point objective (RPO) of zero seconds in case of an outage of a site.

In the past, some computer availability and disaster recovery solutions were limited to a maximum distance between sites. Other past solutions required starting systems, applications, and supporting infrastructure on the backup site that could in some cases take several hours to restart. Some past solutions additionally required modifications to software applications, such as database servers, and hardware, such as routers and switches, in order to implement various disaster recovery and continuous availability functions, resulting in relatively high implementation cost. Some past solutions operated at a site level, rather than at a workload level.

These issues have been substantially addressed by continuous availability solutions between sites at unlimited distances. However, it remains very difficult to be able to achieve an RPO of zero seconds when the sites are separated by relatively long distances.

SUMMARY

According to one embodiment of the present invention, a system for providing continuous availability is provided. The system comprises a second computing site that is geographically remote from a first computing site. The second computing site comprises a storage unit configured to store units of work data and data synchronously replicated from the first computing site. The second computing site further comprises a group of workloads configured to process the units of work data asynchronously replicated from the first computing site. The second computing site further comprises a software replication module configured not to replicate any data while the first computing site is available.

According to another embodiment of the present invention, a method for providing continuous availability is provided. The method comprises, by a first group of workloads of a first computing site, receiving and processing units of work data. The method further comprises, by a first software replication module of the first computing site, asynchronously replicating the units of work data to a second computing site that is geographically remote from the first computing site. The method further comprises, by a first storage unit of the first computing site, storing the units of work data and data that result from processing the units of work data by the first group of workloads. The method further comprises, by a first hardware replication module of a first computing site, synchronously replicating the units of work data and the data to the second computing site. The method further comprises, by a second storage unit of the second computing site, storing the units of work data and the data synchronously replicated from the first computing site. The method further comprises, by a second group of workloads of the second computing site, processing the units of work data asynchronously replicated from the first computing site.

According to yet another embodiment of the present invention, a computer program product for providing continuous availability is provided. The computer program product comprises a computer readable storage medium having stored thereon first program instructions executable by a processor to cause the processor to receive and process units of work data at a first group of workloads of a first computing site, second program instructions executable by a processor to cause the processor to asynchronously replicate the units of work data to a second computing site by a first software replication module of the first computing site, the second computing site being geographically remote from the first computing site, third program instructions executable by a processor to cause the processor to store, in a first storage unit of the first computing site, the units of work data and data that result from processing the units of work data by the first group of workloads, fourth program instructions executable by a processor to cause the processor to synchronously replicate the units of work data and the data from the first storage unit to the second computing site, fifth program instructions executable by a processor to cause the processor to store, in a second storage unit of the second computing site, the units of work data and the data synchronously replicated from the first computing site, and sixth program instructions executable by a processor to cause the processor to process, at a second group of workloads of the second computing site, the units of work data asynchronously replicated from the first computing site.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
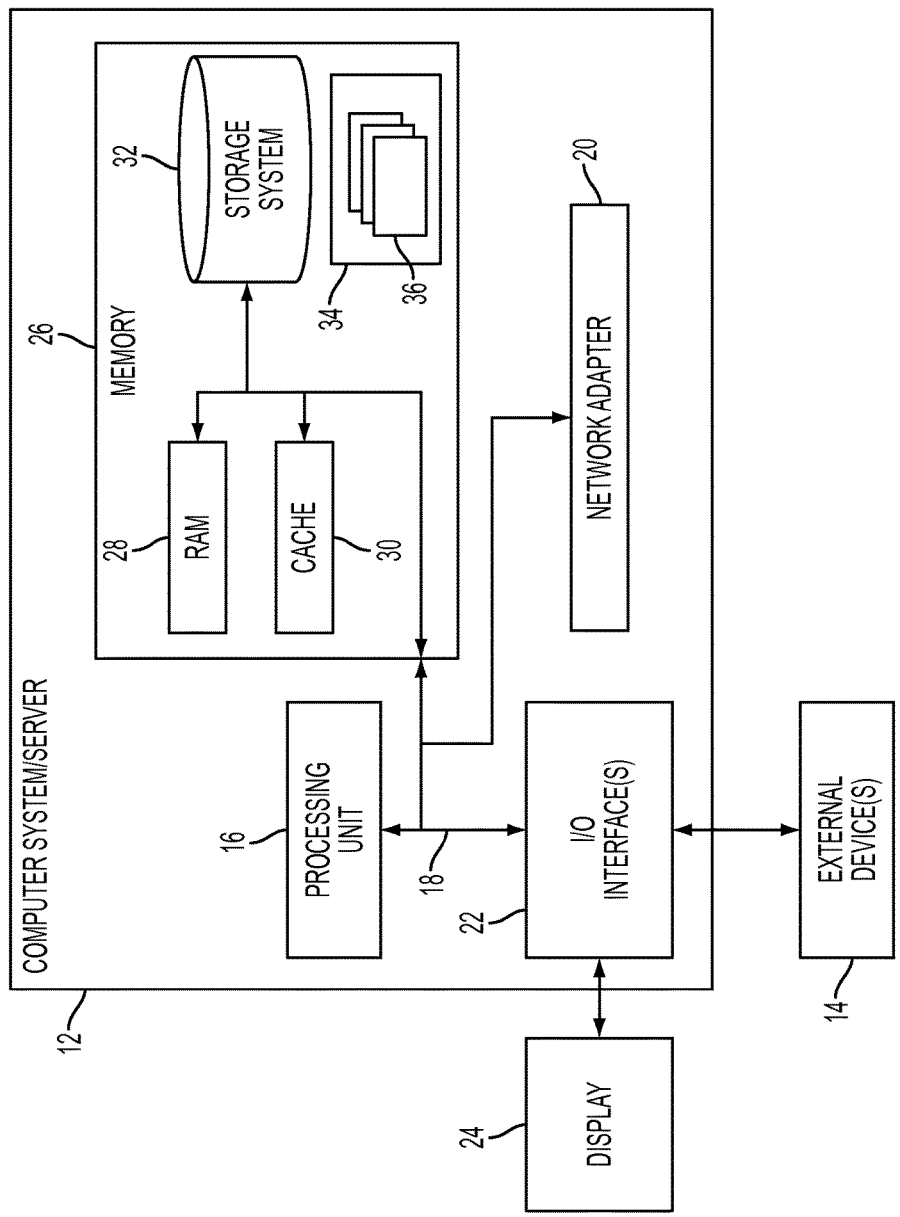
FIG. 1 depicts a cloud computing node according to an embodiment of the present invention.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control over or knowledge of the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
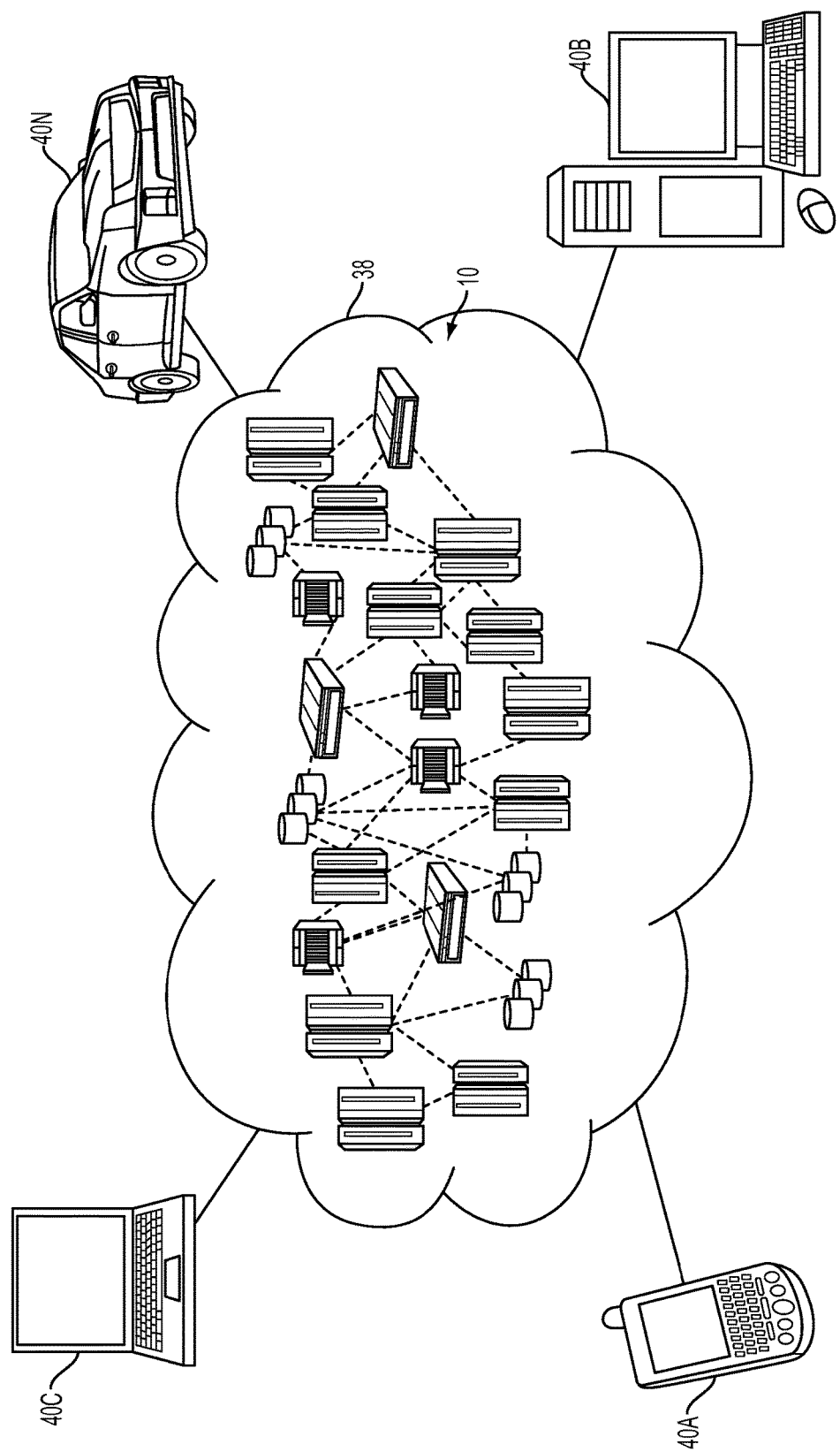
FIG. 2 depicts a cloud computing environment according to an embodiment of the present invention.

Referring now to FIG. 2, illustrative cloud computing environment 38 is depicted. As shown, cloud computing environment 38 comprises one or more cloud computing nodes 10 with which local computing devices used by cloud consumers, such as, for example, personal digital assistant (PDA) or cellular telephone 40A, desktop computer 40B, laptop computer 40C, and/or automobile computer system 40N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 38 to offer infrastructure, platforms and/or software as services for which a cloud consumer does not need to maintain resources on a local computing device. It is understood that the types of computing devices 40A-N shown in FIG. 2 are intended to be illustrative only and that computing nodes 10 and cloud computing environment 38 can communicate with any type of computerized device over any type of network and/or network addressable connection (e.g., using a web browser).

Figure 3:
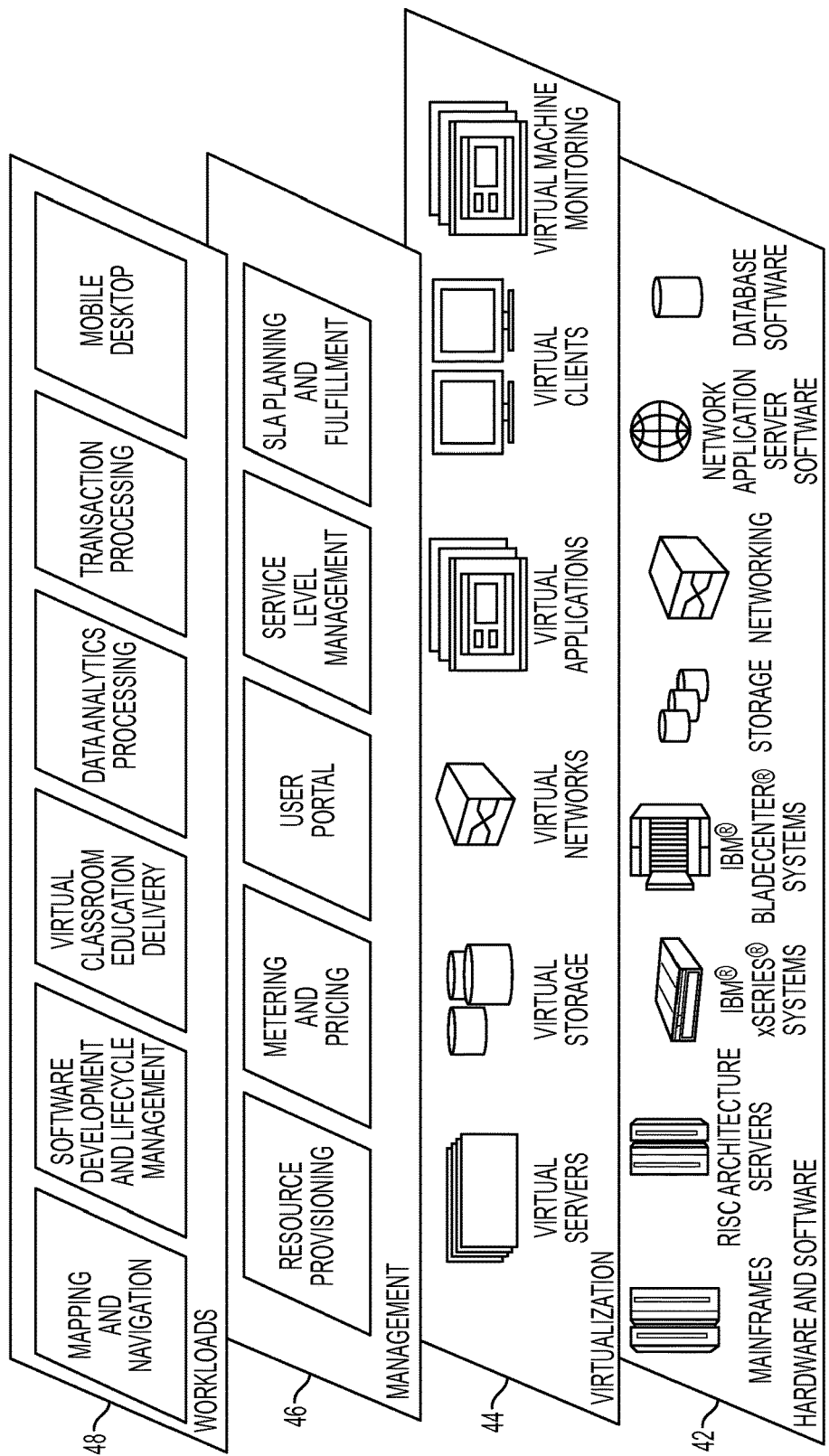
FIG. 3 depicts abstraction model layers according to an embodiment of the present invention.

Referring now to FIG. 3, a set of functional abstraction layers provided by cloud computing environment 38 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 42 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer 44 provides an abstraction layer from which the following examples of virtual entities may be provided: virtual servers; virtual storage; virtual networks, including virtual private networks; virtual applications and operating systems; and virtual clients.

In one example, management layer 46 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 48 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

With regard to the resource provisioning and service level management functions of the management layer 46, some embodiments of the present invention provide continuous availability of workloads, disaster recovery, workload distribution and replication of application data across a plurality of sites. In particular, the embodiments of the invention provide a recover point objective (RPO) of zero seconds for the sites that are separated by relatively long distances.

Some existing availability systems are limited geographically and/or by recovery time. When one or more workloads are spread across multiple servers in a single location, the servers for each workload may share a single data repository, and all data related to each of workloads may be stored in the same location. When the workloads are split among geographically separated sites, a single data repository for each workload is not always feasible.

In these instances, data from the one or more workloads may be stored in a data repository at a primary site, and the data may be synchronized, between the primary site and a copy of the data at the secondary site. The time that it takes to synchronize the databases is called latency. As sites are spread further apart geographically, latency may increase because of the time it takes to move the data over a network in order to synchronize it. For instance, one millisecond of latency is added per 100 fiber kilometers between the sites. Once latency increases beyond a relatively small amount of time, transferring data between data centers requires increasingly longer periods of time to achieve synchronization.

As a result, some existing availability systems provide acceptable workload performance only within a limited geographic area. In some cases, this limited geographic area may be approximately 10 to 20 fiber kilometers (i.e., 10 to 20 linear kilometers of a fiber optic network).

Disaster recovery systems are designed to switch between a primary data center and a backup data center in situations where the primary data center becomes unavailable, such as, for example, during a power outage. For example, during normal operation all transactions may be distributed to the primary data center and the data may be periodically replicated bit-by-bit to the secondary site or sites.

Workloads generally may be executed in parallel on at least two distinct computing systems. Typically, at least two instances of a workload may be executed virtually simultaneously on at least two geographically separated computing systems, for example, an active instance executing on a computing system at a primary site and a standby instance executing on another computing system at a secondary site. Such a configuration may sometimes be referred to in the art as an active-active workload.

The distance between sites may include, for example, distances greater than the area covered within a metro area network (MAN), that is, a network that may span distances measured in tens of kilometers, for example, up to about 20 fiber kilometers. Some customers require that a primary site and a secondary redirection site be separated by distances sufficient to ensure that a disaster affecting one site is not likely to affect the other. Although these distances vary based on regional and environmental conditions, primary and secondary sites sometimes are separated by distances that extend beyond a MAN.

In some embodiments, the customer acceptability window may be measured by the length of an RPO. An RPO, as known in the art, is the unit of time up to which the secondary site's data is current after the primary site becomes unavailable. That is, an RPO defines the maximum targeted time period in which data might be lost after the primary site becomes unavailable. For example, the customer acceptable window may require an RPO of zero seconds of data loss when an unplanned interruption occurs.

In some embodiments, a workload may consist of one or more computing applications or jobs, as well as associated middleware runtime environments, data source objects used by the applications, and the network addressability of the applications. In some embodiments, a workload may consist of one or more computing applications, jobs or threads that are relatively time-sensitive and preferably will not be suspended at all, not even for a brief moment. In some embodiments, a workload includes a database, or a file system, a set of applications or resources that use, access and/or manage the database and/or file system.

A unit of work data may include one or more computing transactions and/or processes substantially performed as a group to service one or more requests. A unit of work data may include, for example, data generated by or otherwise associated with a single computing transaction and/or process, or with multiple computing transactions and/or processes substantially performed as a group to service one or more requests. A data object may include, for example, any combination of related or associated data.

In an embodiment, the continuous availability system may include a workload distribution module that collects metrics at the software application, middleware, operating system, network, and hardware levels for each workload. The continuous availability system may use the collected metrics to provide continuous availability and workload redirection capabilities across multiple computing sites.

Some embodiments of the invention provide systems and methods for achieving zero-data-loss recovery in an active-active sites configuration with a recovery time objective (RTO) measured in seconds, or at most a few minutes, for transactions that require data updates and sub-second for read-only transactions that can tolerate temperate data staleness, following an outage of a site. An RTO, as known in the art, is the maximum amount of time needed to begin normal operations after the primary site experiences an outage. The embodiments of the invention switch transactions to a geographically remote site where a remote read-only standby sharing workload coupled with a synchronous disk replication of recover logs is used for fast restart and for preventing data loss (zero RPO). Asynchronous log capture replication of the workloads to another data sharing parallel system is used for uninterrupted service.

Figure 4:
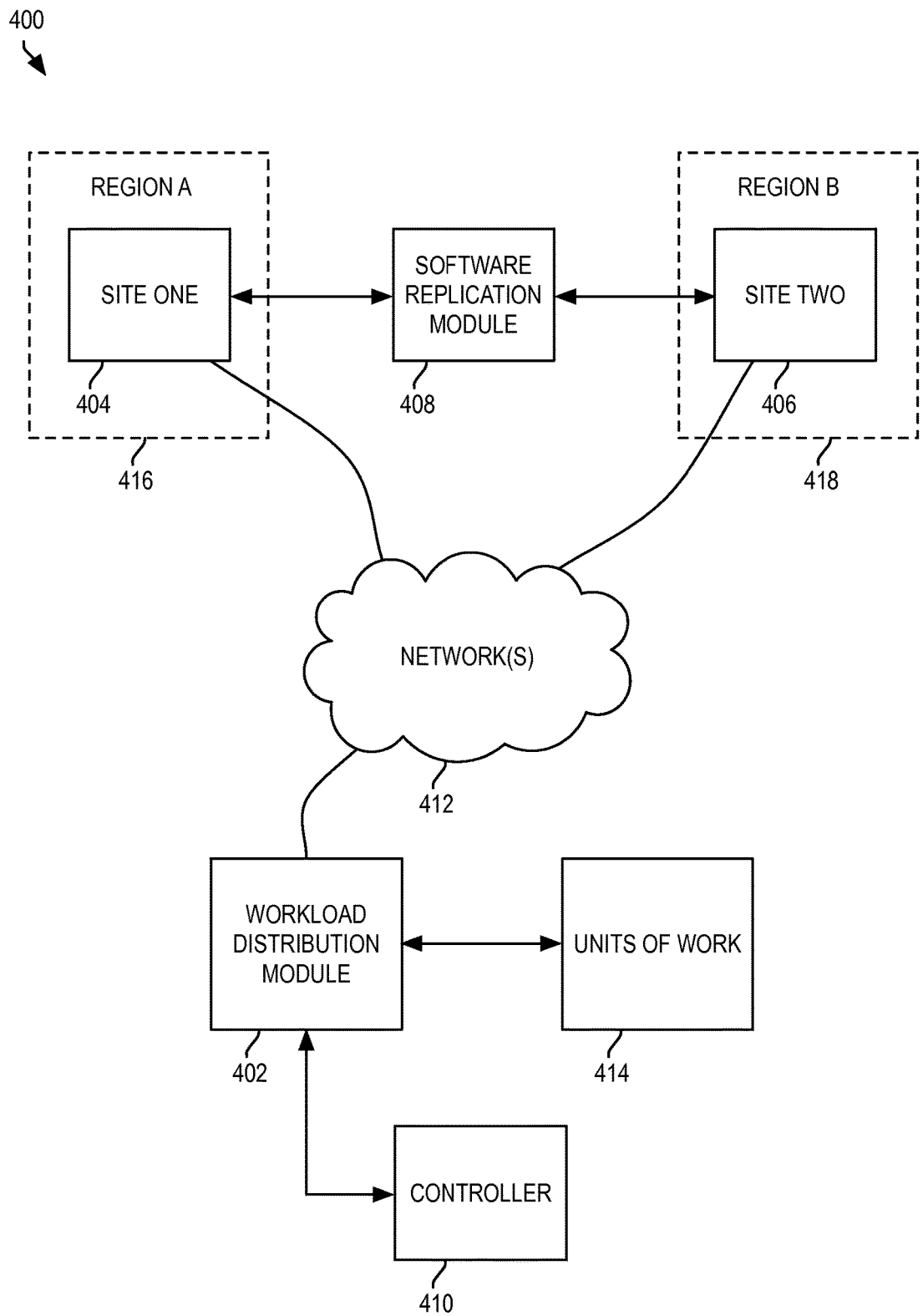
FIG. 4 illustrates a schematic diagram of a continuous availability system in accordance with an embodiment of the present invention.

With reference now to FIG. 4, an embodiment of the present invention may include a continuous availability system 400 for implementing continuous availability for workloads across multiple sites that are geographically separated. The system 400 may include a workload distribution module 402 executing computer instructions. The workload distribution module 402 may operate in any type of environment that is capable of executing a software application. For example, the workload distribution module 402 may include a high-speed, multiuser, multitasking computer processing device, such as a mainframe computer. In some embodiments, the workload distribution module 402 may be associated with an enterprise (e.g., a commercial business) that implements the continuous availability across multiple sites that are geographically separated.

The continuous availability depicted in FIG. 4 may include one or more computing sites, such as, for example, site one 404 and site two 406. Each of the sites 404, 406 may include one or more systems executing one or more workloads. The workloads may include transaction processing applications, database applications, queue and queue management operations, and the like. Each of the sites 404 and 406 may include, for example, one or more network hardware devices and/or software for managing and distributing network traffic.

Site one 404 and site two 406 may be geographically distributed computing sites. For example, site one 404 may be located in one region, for example region A 416, and site two 406 may be located in another region, for example, region B 418, that is relatively geographically distant from region A 416. The geographic distance between region A 416 and region B 418 may provide for a relatively high probability that computer processing sites in region A 416 will not suffer outages, or otherwise become unavailable, at the same time as computer processing sites in region B 418. In particular, the geographic distance between region A 416 and region B 418 may provide for a relatively high probability that computer processing sites in region A 416 and sites in region B 418 will not suffer outages, or otherwise become unavailable, due to a common cause, such as a regional power outage or natural disaster.

The continuous availability system 400 depicted in FIG. 4 additionally may include a software replication module 408. The software replication module 408, which will be described in more detail below, may asynchronously replicate data for workloads between site one 404 and site two 406. The continuous availability system 400 further may include a controller 410, which may control the operation of the various components of the continuous availability system 400, including, for example, the workload distribution module 402, which is described in more detail below.

The workload distribution module 402 and the sites 404 and 406 may be communicatively coupled via one or more networks 412. The networks 412 may be implemented using any type or combination of known networking device, including, but not limited to, a wide area network (WAN), a local area network (LAN), a global network (e.g., Internet), a virtual private network (VPN), an intranet and a telephone network. The networks 412 may be implemented using a wireless network or any kind of physical network implementation known in the art.

The sites, such as site one 404 and site two 406 may be coupled to the workload distribution module 402 through multiple networks (e.g., intranet and Internet) such that not all of the sites are coupled to the workload distribution module 402 through the same network. The workload distribution module 402 may be implemented using one or more servers, for example, operating in response to a computer program stored in a storage medium accessible by the server.

In the continuous availability system 400, units of work 414 initiated by users of the various systems or clients executing at the one or more sites may be distributed to one or more of the sites 404 and 406 through the workload distribution module 402. The units of work 414 may be transmitted from systems outside of the sites 404 and 406 and may be processed as workloads within one or more of the sites.

It will be readily understood by a person of ordinary skill in the art that the execution of continuous availability across geographically dispersed sites described in FIG. 4 may be implemented as modules in hardware, software executing on general-purpose hardware, or a combination thereof. Although only two sites are depicted in FIG. 4, it will be further understood that, in an embodiment, any number of sites may be implemented, and that any geographic distance may separate the sites. Furthermore, although the workload distribution module 402 is depicted as existing outside of the sites, it will be readily understood by a person of ordinary skill in the art that, in an embodiment, the workload distribution module 402 may be directly located at one or more of the sites.

Figure 5:
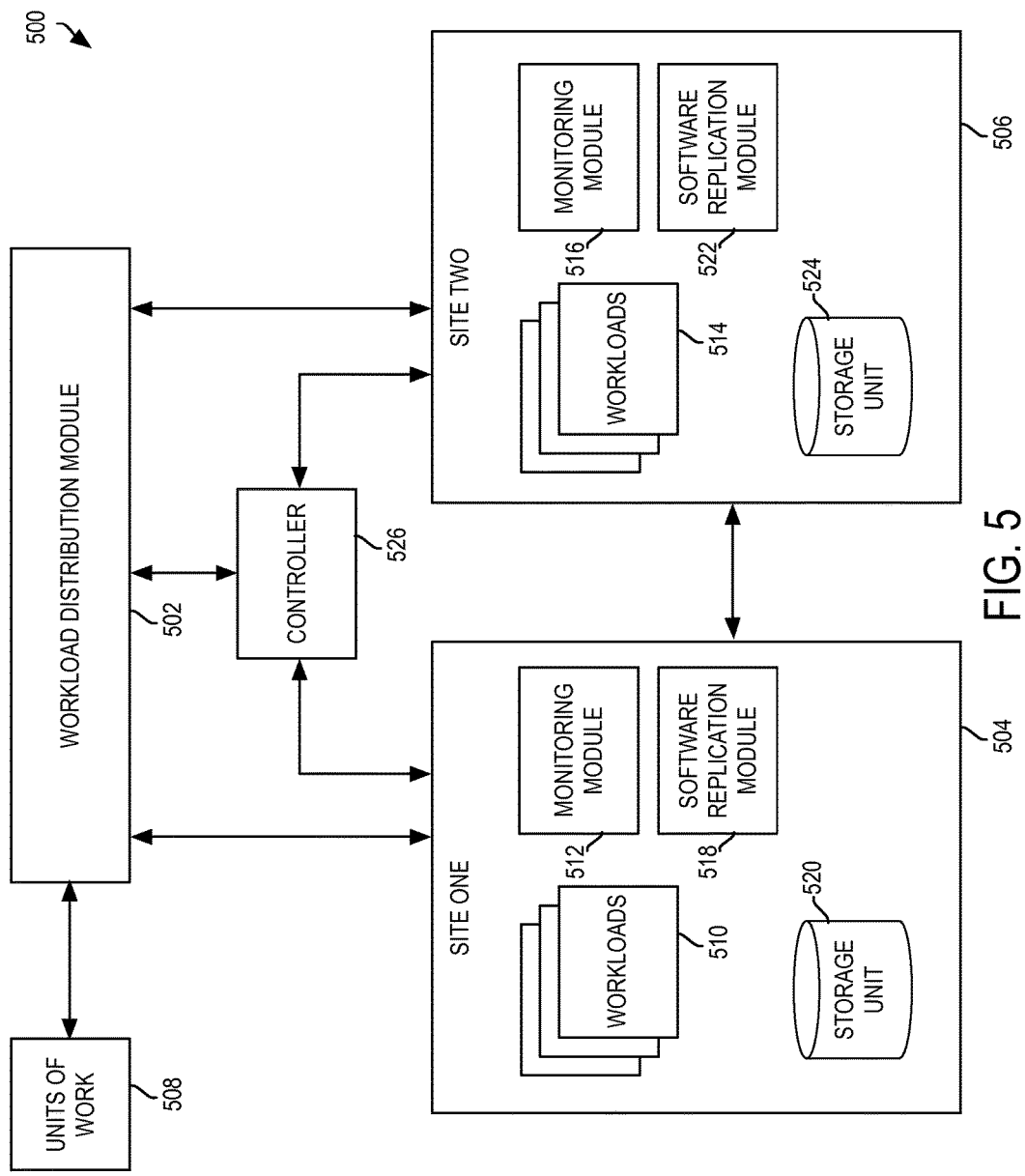
FIG. 5 illustrates a schematic diagram of a continuous availability system in accordance with an embodiment of the present invention.

FIG. 5 illustrates a schematic diagram of the various components in accordance with some embodiments of the invention. A continuous availability system 500 includes a workload distribution module 502. In an embodiment, the workload distribution module 502 may collect metrics from multiple computing sites, for example, site two 506 and site one 504. The metrics collected for each of the workloads may include, for example, processor speed, pending transactions, transaction execution time, system availability, network bandwidth utilization and availability, and any other performance-based metrics known in the art. The workload distribution module 502 may use the metrics in order to distribute one or more units of work 508 for one or more workloads to site one 504 and site two 506.

Individual units of work may be received or may be initiated at one of the site one 504 or site two 506. For example, in some embodiments site one 504 may include a computer system that is simultaneously or intermittently executing one or more workloads 510. In other embodiments, site one 504 may include a group of servers, such as a server farm, operating on one or more workloads 510 using local load balancing, or other methods of load distributing as is known in the art. In yet another embodiment, site one 504 may include multiple systems, each of which may execute one or more workloads 510. In various embodiments, site one 504 may include a combination of servers and server farms each operating on one or more workloads.

In addition, site one 504 may include one or more monitoring modules, such as site one monitoring module 512. The site one monitoring module 512 may be communicatively coupled to the workload distribution module 502, such as through a network, and may transmit metrics from the site one 504 to the workload distribution module 502. In some embodiments, the site one monitoring module 512 may be executed on a single computer. In other embodiments, a monitoring module is executed on each of the systems executing at the site one 504. In yet other embodiments, multiple monitoring modules, one on each server, monitor and report metrics to the workload distribution module 502.

Furthermore, the site one monitoring module 512 may be configured to monitor the systems executing at site one 504. In some embodiments, the site one monitoring module 512 may be configured to monitor the available hardware processing capacity of the computer processors executing at the site one 504. In other embodiments, the site one monitoring module 512 may be configured to monitor the available network capacity of the site one 504. In yet other embodiments, the site one monitoring module 512 may be configured to monitor the one or more workloads 510 executing at the site one 504.

In various embodiments, the site one monitoring module 512 may monitor various characteristics of the workloads 510, such as the number of queued transactions, the availability of the workloads 510 to handle additional transactions, the number of threads associated with each of the one or more workloads 510 and any other workload-specific characteristics as is known in the art. Similarly, site two 506 may include a site two monitoring module 516, the operation of which may be analogous to that of the site one monitoring module 512.

In addition, site one 504 may include a software replication module 518 and a storage unit 520. Likewise, site two 506 may include a software replication module 522, and a storage unit 524. The software replication modules 518, 522 may be configured to asynchronously replicate units of work, from the workloads 510, 514 from the respective sites 504, 506. The software replication modules 518, 522 may collect units of work from the workloads 510, 514 and coordinate the replication of those units of work on the other site 506, 504 at relatively frequent intervals or periods, such as, for example, at a substantially real-time rate, in order to maintain the active and standby instances of a workload substantially synchronized. For example, the software replication modules 518, 522 may replicate unit of work data, such as logged transactional data, that is, logged data based on transactional boundaries, from the primary site, for example, site one 504, to the secondary site, for example, site two 506, subsequent to each transaction at the primary site.

Multiple workloads may execute on separate sites, and each may be replicated to one or more other sites. For example, a workload 510 may execute on site one 504 and be replicated to site two 506, while another workload 514 executes on site two 506 and is simultaneously replicated on site one 504. In an embodiment, if the metrics for each workload indicate that one of the sites is overloaded, the workload distribution module 502 may distribute all units of work for that workload to another site. Of course, in various embodiments, any number of additional sites may be configured to provide load balancing and replication of units of work.

Although the controller 526 of FIG. 5 is depicted as a stand-alone module, it will be understood that, in various embodiments, the controller 526 may be executed in the workload distribution module 502 or in any combination of the sites 504, 506. For example, in an embodiment, the controller 526 may communicate with each of the sites 504, 506 and may be configured to coordinate transactions and replication of the units of work between the various sites. The controller 526 may communicate with the workload distribution module 502, and use information provided by each of those modules to coordinate transactions and replication of the units of work for each workload between the various sites.

The illustration of FIG. 5 is a simplified representation of the various components of the continuous availability system 500 for purposes of clarity. It will be understood by those of ordinary skill in the art, that additional or fewer components may be used in alternate embodiments. In additional embodiments, the layout and configuration of the components may differ from those of FIG. 5 without affecting the functionality of the continuous availability system 500. In additional embodiments, the various components may be located in separate modules. In further embodiments, the functionality of various components may be incorporated into a single hardware or software module.

It is to be noted that, if one of the sites of the continuous availability system 500, for example, site one 504 suffers outages, or otherwise becomes unavailable before a transaction at site one 504 is completed, this transaction may be lost before the unit of work data for the transaction get asynchronously replicated to site two 506. This is because there is a replication delay at the time of the outage of site one 504, generally on the order of sub-seconds, but possibly more if and when the outage or other system conditions affect replication delays. Therefore, the RPO for the continuous availability system 500 is non-zero, and probably as much time as the replication delay. Despite the non-zero RPO, such an asynchronous replication technique is employed by the continuous availability system 500 of some embodiments because the asynchronous replication technique allows unlimited distance between sites and avoids impacting transaction execution at a primary site for the transaction.

Figure 6:
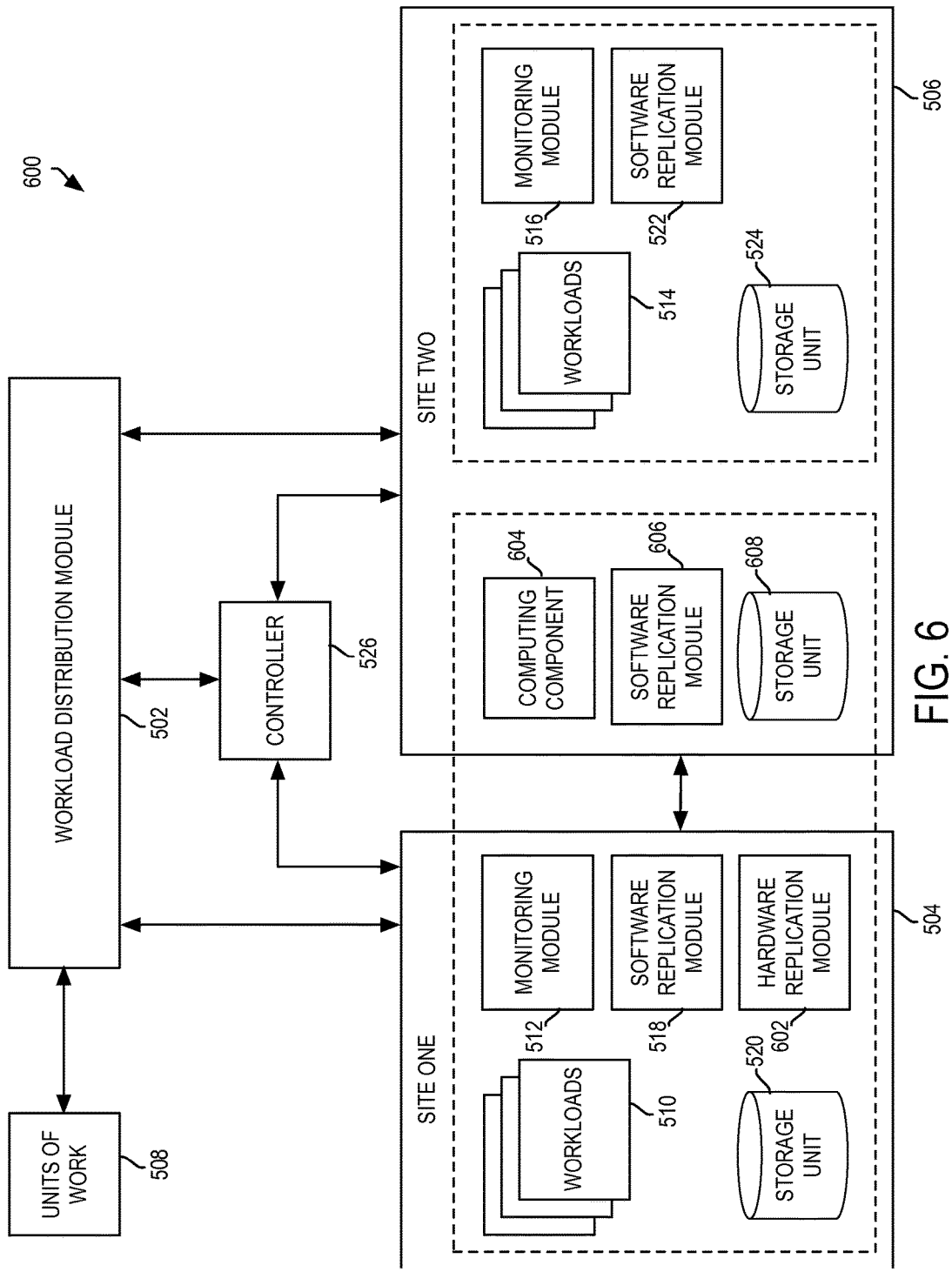
FIG. 6 illustrates a schematic diagram of a continuous availability system after an outage of a computing site in accordance with an embodiment of the present invention.

FIG. 6 illustrates a continuous availability system 600 in accordance with some embodiments of the invention. The system 600, unlike the system 500 described above, provides an active-active architecture without suffering any data loss (i.e., RPO of zero) when a primary site for a unit of work becomes unavailable. In some embodiments, the continuously availability system 600 includes all components of the system 500 of FIG. 5. In addition, the continuous availability system 600 includes a hardware replication module 602 at site one 504 and includes a computing component 604, a software replication module 606, and a storage unit 608 at site two 506.

The computing component 604 at site two 506 is a single computer system that belongs to a cluster of computing systems that also includes the computing systems (not shown) executing the one or more workloads 510 at site one 504. This cluster of computing systems act together as a single computing system by having shared access to shared data via a central locking (not shown) and a shared buffer component (not shown). The computing component 604, however, is configured not to process any unit of work unless or until site one 504 becomes unavailable. Because the computing component 604 does not process any unit of work while site one 504 is operational, the computing component 604 has no dependency on the shared data while site one 504 is operational. Having no dependency on shared data makes it possible to restart a DBMS very quickly if the computing system 604 executes a DBMS. With dependency on the shared data, it would take hours to restart a database on site two 506. The one or more workloads 514 at site two 506 do not belong to this cluster and are members of another cluster of workloads 612.

The storage unit 608 is configured to back up the contents of the storage unit 520 of site one 504 as a mirrored copy. The backed up contents become available in the case that site one 504 should become unavailable. In some embodiments, the hardware replication module 602 synchronously replicates the contents from the storage unit 520 at site one 504 to the storage unit 608 at site two 506. That is, the hardware replication module 602 replicates the contents of the storage unit 520 simultaneously with or immediately after each write function to the storage unit 520. In some embodiments, the hardware replication module 602 performs disk replication, copying or mirroring a complete image of the storage unit 520. In some embodiments, the hardware replication module 602 replicates only disk I/O (input/output), and not memory I/O.

Like the computing component 604, the software replication module 606 is configured not to perform any replication unless or until site one 504 becomes unavailable. The software replication module 606 replicates the contents of the storage unit 608 to workloads 514 as soon as the site one 504 becomes unavailable and the computing component 604 starts to operate, as indicated by an arrow 802. The contents of the storage unit 608 should include any transactional logs for units of work that were received at site one 504 before site one 504 becomes unavailable and that have not been processed by workloads 510 or workloads 514. The software replication module 606 thus effectively resumes the asynchronous replication stopped at the software replication module 518 at site one 504 when site one 504 becomes unavailable.

As discussed above, when site one 504 is operational, the software replication modules 518 at site one 504 may replicate unit of work data, such as logged transactional data from site one 504 to site two 506, subsequent to each transaction at site one 504. In some embodiments, the software replication module 518 employs a log capture replication technique, which is performed using a DBMS interfaces that provide access to active log buffers (not shown), allowing to read log records even before the records are persisted to a disk on a DBMS commit. In some embodiments, the replication capture process replicates the log records to the remote site if and only after a commit log record is read. In some embodiments, the DBMS interfaces mask the location of the log records, even retrieves the log records from archive if needed, should the replication capture process is behind, for example, after having been stopped and restarted.

In some embodiments, the software replication module 518 employing the replication log capture replication techniques filters out uninteresting log records and sends only a minimal amount of data for replay at the remote site 506. For example, for transactions that updates database, only the change column values need to be sent for replay at the remote site. The contents of many log records, such as transaction management log records do not get replicated for transaction-replay, and thereby reducing the amount of data transmitted to the remote site for increased performance. Running the capture replication process at the source site 504 also eliminates the need for any access to the remote computing component 604, which is beneficial if and when the capture replication process needs to update any information in the source database at the source site 504, such as tables for controlling the state of the replication process. In other embodiments, the capture replication process may run at site two 506, reading the DBMS logs via the computing component 604 at site two 506. The computing component 604 restarts the DBMS and resumes the log capture process to drain the backlog in the log, if and when site two 504 is lost.

As described above, the computing component 604 at site two 506 is not used for writing data while site one 504 is operational. Because there is no write activity performed by the computing component 604 on the storage unit 608, a very fast restart may be achieved. For a relational DBMS, such as DB2 for IBM's z/OS, there is no need to duplex the global buffer pool, the Coupling Facility structures, and the Shared Communication Area (SCA). Avoiding the duplexing of structures ensures fast restart of the DBMS without any performance impact while site one 504 is operational.

As discussed above with reference to FIG. 5, some units of work that are supposed to be processed by the workloads 510 and then by the workload 514 may be lost when site one 504 becomes unavailable. The continuous availability system 600 does not suffer such data loss by having the computing component 604, the software replication 606, and the storage unit 608 configured as described above.

Figure 7:
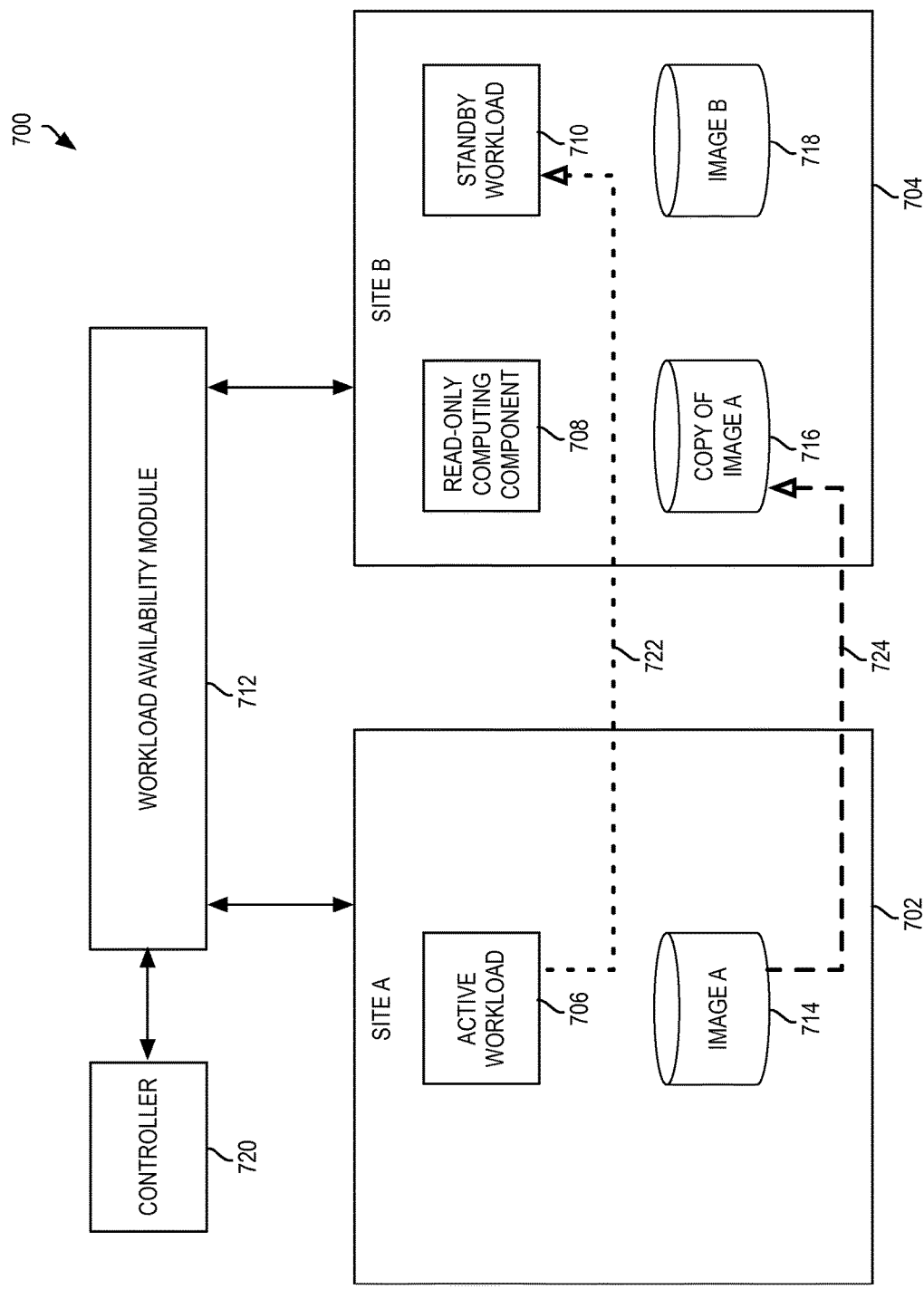
FIG. 7 illustrates a schematic diagram of a continuous availability system after an outage of a computing site in accordance with an embodiment of the present invention.

FIG. 7 is a schematic diagram that illustrates a simplified multisite, multi-workload, continuous availability system 700, including multiple geographically distributed computing sites, for example, Site A 702 and Site B 704. Site A 702 may be located in one region, for example region 1 (not shown), and Site B 704 may be located in another region, for example, region 2 (not shown), that is relatively geographically distant from region 1. The geographic distance between region 1 and region 2 may provide for a relatively high probability that computer processing sites in region 1 will not suffer outages, or otherwise become unavailable, at the same time as computer processing sites in region 2. In particular, the geographic distance between region 1 and region 2 may provide for a relatively high probability that computer processing sites in region 1 and sites in region 2 will not suffer outages, or otherwise become unavailable, due to a common cause, such as a regional power outage.

The primary computing site in this example, Site A 702, may host an active workload 706. The active workload 706 may be provided with continuous availability and workload redirection provisions, including software replication methods. For example, a standby workload 710 may be executed in parallel on Site B 704. That is, the program instructions, associated data and state information of active workload 706 may be replicated from the storage unit 714 at Site A 702 to the storage unit 718 at Site B, for example, by the software replication module 408 of FIG. 4, as indicated by the arrow 722, and the workload program instructions may be executed at Site A 702 and at Site B 704 as an active workload 706 and as a standby workload 710. In addition, the active workload 706 may be provided with reliable availability (e.g., zero RPO), including managed hardware replication techniques. For example, the contents, or image, of a storage unit 714 at Site A (Image A), including the program instructions, may be synchronously replicated to maintain a copy of the contents on a storage unit 716 at Site B (Copy A), as indicated by the arrow 724.

The storage units 714, 716, 718 may include any type of computer memory medium organized in any format, such as, for example, a relational model database server, a hierarchical database, an information management system, a virtual storage access method server, a hard disk drive (HDD), optical storage medium, magnetic tape, or any other acceptable memory medium. A database may include, for example, any group of files organized in association with any database manager known in the art.

The software replication and hardware replication may be coordinated, or managed, by workload availability module 712, which may be communicatively linked with a controller 720. The workload availability module 712 may communicate with the various sites via a network, such as the one or more networks 412 of FIG. 4. Thus, at any given moment in time, the contents of the storage unit 714 at Site A 702 may be backed up by a mirrored copy at a backup site, such as the storage unit 716 at Site B 704, which may be available in the case that Site A 702 should become unavailable.

Figure 8:
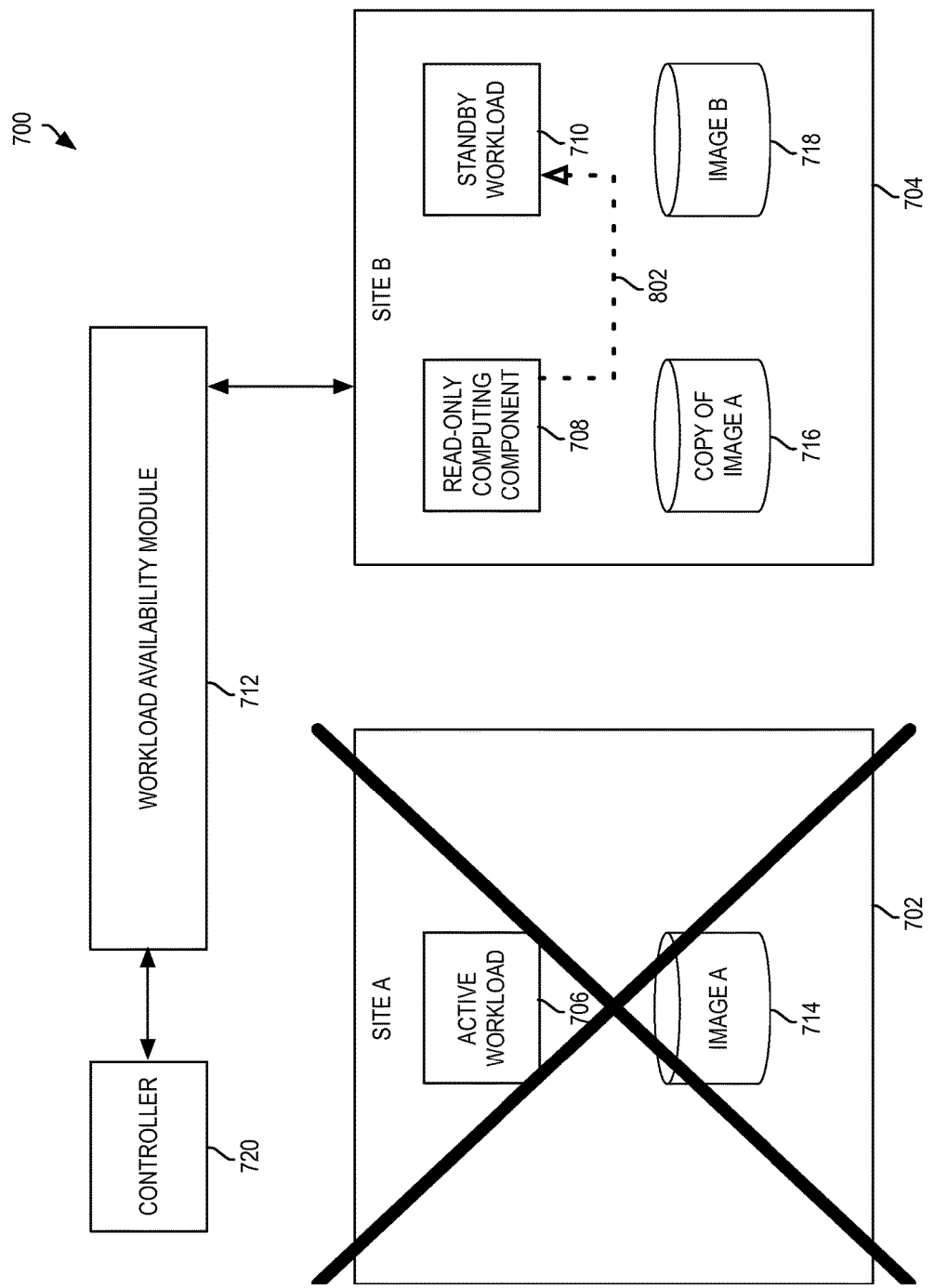
FIG. 8 illustrates a schematic diagram of a continuous availability system after an outage of a computing site in accordance with an embodiment of the present invention.

The workload availability module 712 may be configured to detect that Site A 702 is unavailable, or that the active workload 706 is not executing on the primary site. In this case, as shown in FIG. 8, the workload availability module 712 may reassign and automatically redirect the units of work from active workload 706 to standby workload 710 at Site B 704 (i.e., transmit the ongoing/future data stream of active workload 706 to Site B 704), and designate the execution of workload 710 at Site B as the active workload.

In order to provide continuous availability with zero RPO, the workload availability module 712 may restart the hardware replicated image (Copy A) and activate read-only computing component 708 at Site B so that the software replication may be resumed to replicate any units of work that had not been replicated from the active workload 706 to the active workload 710 as Site A became available.

Workload redirection may occur because of an emergency or unplanned system or site outage, for example, based on metrics received from Site A 702. Alternatively, in an embodiment, the workload redirection may occur because of a planned system or site outage, for example, initiated by a program script and/or instructions from an operator.

Figure 9:
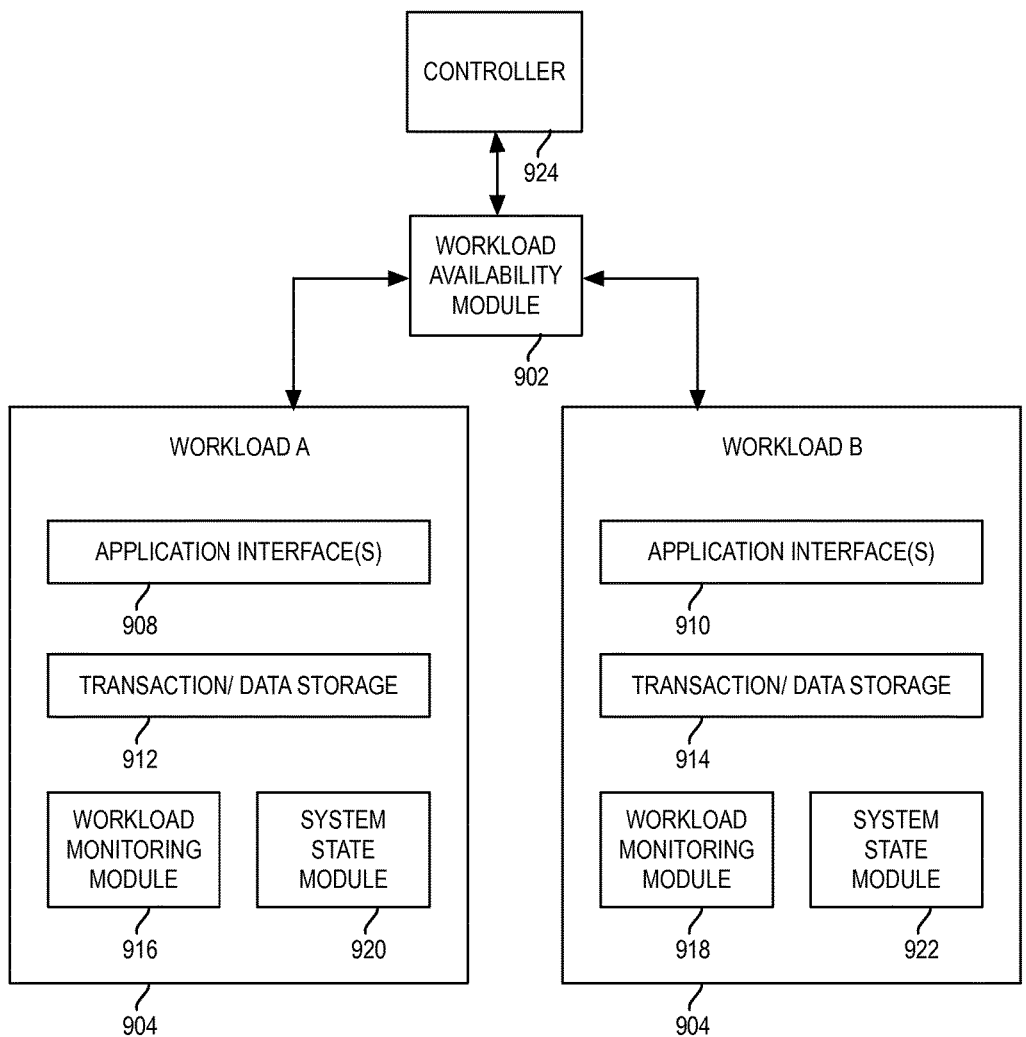
FIG. 9 illustrates a schematic diagram of an individual site implementation of a continuous availability system in accordance with an embodiment of the present invention.

FIG. 9 illustrates a block diagram of an individual site 900 associated with an integral continuous/reliable workload availability module 902 in accordance with an embodiment of the invention. The workload availability module 902 may incorporate the functionality of the workload distribution module 402 and the software replication module 408 of FIG. 4, and may be communicatively coupled to a controller 164 and to one or more workloads executing at the site 900. The workload availability module 902 may coordinate distribution of units of work for the workload A 904. Both the workload A 904 and the active workload B 906 may include an application interface 908, 910 that may facilitate communication of units of work to the workload A 904, the active workload B 906, or both.

The application interfaces 908, 910 may be configured to use any type of application interface known in the art, such as, for example, TCP/IP, message queuing, remote procedure execution, or any other suitable interface. Both the workload A 904 and the workload B 906 additionally may include a transaction and data storage unit 912, 914. In one embodiment, the transaction and data storage units 912, 914 may include, for example, a database storage system. In another embodiment, the transaction and data storage units 912, 914 may include a file-based system. In yet another embodiment, the transaction and data storage units 912, 914 may include a transaction-based storage such as a queue. In other embodiments, the transaction and data storage units 912, 914 may be any storage as is known in the art.

The workload A 904 additionally may be associated with a workload monitoring module 916. In The workload monitoring module 916 may monitor the performance of the workloads and the system processing load. The workload monitoring module 916 may be configured to determine the transaction processing speed of the workloads, the number of threads executing for each workload, the number of transactions queued for processing, and/or any other workload processing related information. The workload monitoring module 916 may be communicatively coupled to a monitoring module, such as the site one monitoring module 512 of FIG. 5, which may transmit the workload metrics to the workload availability module 902.

The workload A 904 and the active workload B 906 may further include system state monitors 920, 922. The system state monitors 920, 922 may communicate to the workload availability module 902 whether or not the workload A 904 and the active workload B 906 are currently operating within specified tolerances. When either the workload A 904 or the active workload B 906 should stop operating correctly, the system state monitors 920, 922 may notify the workload availability module 902.

In an embodiment, if one site is unavailable, such as where a network becomes unavailable, a power outage is encountered or a hardware failure exists, the site may be automatically removed from consideration until the issues have been corrected. In an additional embodiment, if the workload is unavailable, for example, because of a system error or a scheduled outage, the workload is directed to an alternate site that is capable of processing the units of work.

Figure 10:
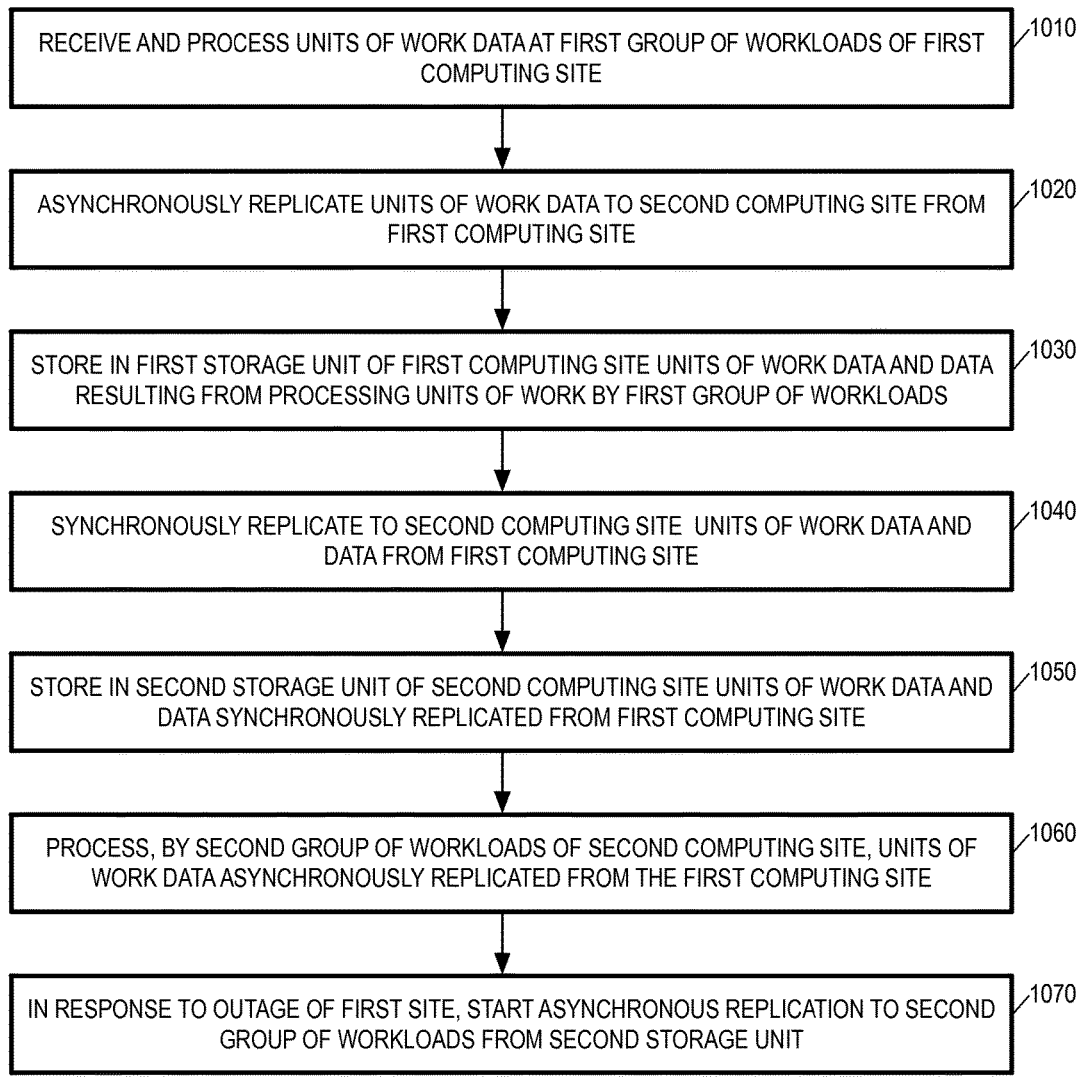
FIG. 10 illustrates a process flow for providing continuous availability with recovery point objective of zero seconds in accordance with an embodiment of the present invention.

FIG. 10 illustrates a process flow for providing continuous availability with an RPO of zero seconds. At block 1010, units of work data are received and processed at a first group of workloads of a first computing site. At block 1020, the units of work data are asynchronously replicated to a second computing site by a first software replication module of the first computing site. In some embodiments, a subset of the units of work data to be replicated to the second computing site is selected by the first software replication module. The second computing site is geographically remote from the first computing site. Specifically, in some embodiments, the first and second computing sites are separated by a distance greater than a MAN.

At block 1030, the units of work data and data that result from processing the units of work data by the first group of workloads are stored in a first storage unit of the first computing site. At block 1040, the units of work data and the data from the first storage are synchronously replicated unit to the second computing site. In some embodiments, the units of work data and the data that are synchronously replicated are associated with disk write operations and not with disk read operations. That is, only a subset of disk operations are replicated to the second computing site.

At block 1050, the units of work data and the data that are synchronously replicated from the first computing site are stored in a second storage unit of the second computing site. At block 1060, the units of work data that are asynchronously replicated from the first computing site are processed by a second group of workloads of the second computing site.

At block 1070, asynchronous replication of the units of work data stored in the second storage unit to the second group of workloads is started by a second software replication module of the second computing site in response to an outage of the first computing site, in order to replicate, to the second group of workloads, any unit of work data that is not asynchronously replicated to the second group of workloads due to the outage of the first computing site. The second group of workloads process the units of work data replicated by the second software replication module. In some embodiments, the second software replication module does not replicate any data while the first computing site is available. In some embodiments, a single computing component of the second computing site does not process any unit of work data while the first computing site is available. In some embodiments, the second group of workloads start receiving units of work data from a workload distribution module in response to an outage of the first computing site.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing continuous availability, comprising:

by a first group of workloads of a first computing site, receiving units of work data, processing the units of work data, and outputting data results in response to the processing of the units of work data, wherein the first group of workloads includes a database;

by a first software replication module of the first computing site, asynchronously replicating the units of work data to a second computing site that is geographically remote from the first computing site, wherein the units of work data that are asynchronously replicated includes a subset of logged transactional data, wherein the first software replication module employs a log capture replication technique that filters logged transactional data and provides access to active log buffers via one or more database management system (DBMS) interfaces of the first computing site, wherein the active log buffers store log records at least before the log records are persisted to a disk on a DBMS commit, wherein the log capture replication technique filters out log records by sending to the second computing site only change column values for transactions that update the database;

by a first storage unit of the first computing site, storing the units of work data and storing the outputted data results;

by a first hardware replication module of a first computing site, synchronously replicating, from the first storage unit to the second computing site, the units of work data and the outputted data results, wherein the units of work data and the outputted data results that are synchronously replicated by the first hardware replication module are associated with disk write operations and not with disk read operations;

by a second storage unit of the second computing site, storing the units of work data that were synchronously replicated from the first computing site to the second computing site and storing the outputted data results that were synchronously replicated from the first computing site to the second computing site;

by a second group of workloads of the second computing site, processing the units of work data that were asynchronously replicated from the first computing site;

by a read-only computing component of the second computing site, the read-only component becoming active in response to detecting an outage of the first computing site; and by a second software replication module of the second computing site, replicating no data while the first computing site is available, and starting asynchronous replication of the units of work data stored in the second storage unit to the second group of workloads in response to the detected outage of the first computing site such that asynchronous replication is resumed for any units of the units of work data that have not been asynchronously replicated to the second group of workloads due to the detected outage of the first computing site.

2. The method of claim 1, further comprising:

by a single computing component of the second computing site, processing no unit of work data while the first computing site is available.

3. The method of claim 1, further comprising:

by the second group of workloads, starting receiving units of work data in response to an outage of the first computing site.

4. The method of claim 1, wherein the first and second computing sites are separated by a distance greater than a metropolitan area network (MAN).

* * * * *